Aug. 31, 1965
M. C. HESSE
3,203,400
CATTLE OILER
Filed Feb. 1, 1963
2 Sheets-Sheet 1
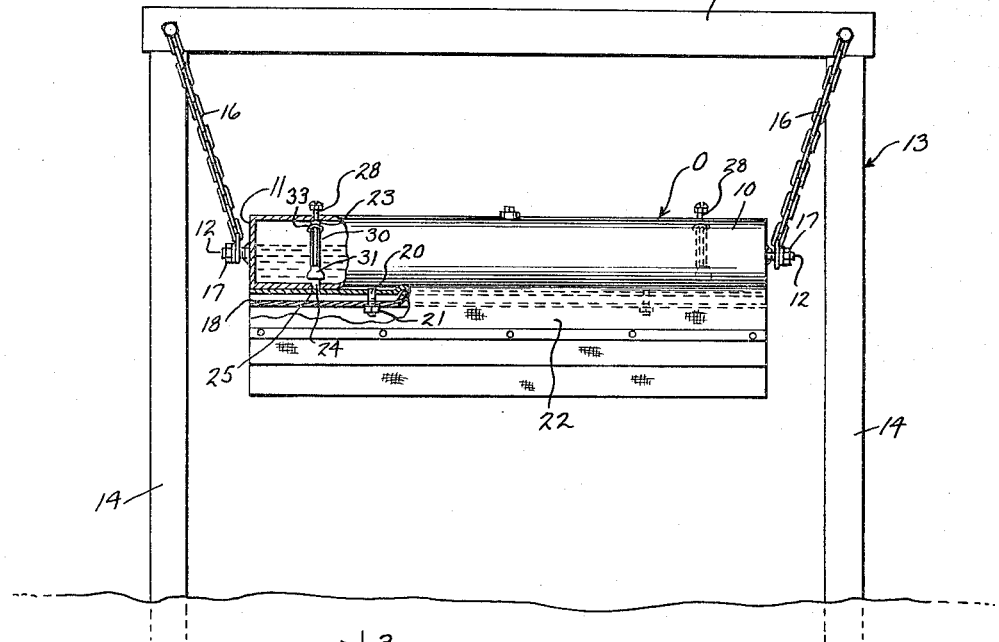
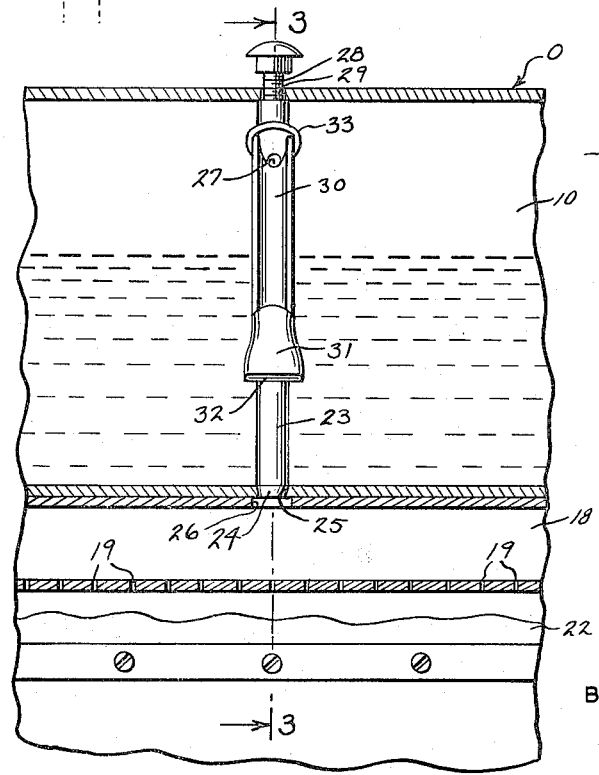
INVENTOR
MYRON C. HESSE
BY
*Wright Wright*
ATTORNEYS Aug. 31, 1965  M. C. HESSE  3,203,400
CATTLE OILER
Filed Feb. 1, 1963  2 Sheets-Sheet 2
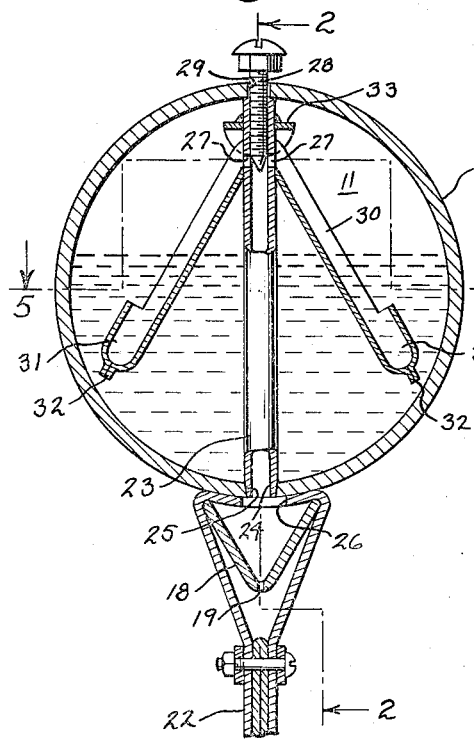
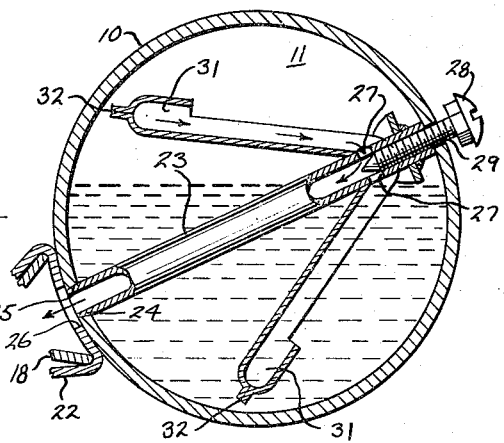
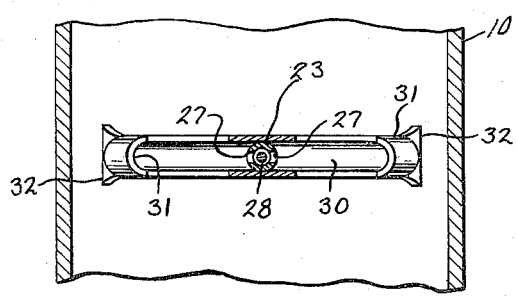
INVENTOR
MYRON C. HESSE
BY
*Wright and Wright*
ATTORNEYS

United States Patent Office 3,203,400
Patented Aug. 31, 1965

3,203,400
CATTLE OILER
Myron C. Hesse, Pender, Nebr.
Filed Feb. 1, 1963, Ser. No. 255,451
2 Claims. (Cl. 119—157)

This invention appertains to animal oilers of the type for applying an oil or insecticide, or a combination of both, to livestock as the livestock pass under the oiler, the invention being an improvement over my prior Patent No. 2,961,998 issued to me Nov. 29, 1960.

One of the primary objects of my present invention is to provide a novel means for supplying a measured quantity of liquid from the tank to the liquid dispensing trough each time the tank is tilted or turned incident to the passage of an animal beneath the tank or rubbing of the animal against the tank and the fabric applicator suspended from the tank.

Another salient object of my invention is the provision of dippers normally immersed in the liquid in the tank carried by inclined channels leading from the opposite sides of the feed tubes at the upper ends thereof and communicating therewith through suitable openings, the feed tubes in turn opening into the distributing trough, so that upon the rocking or turning of the tank by the animals, the dippers will turn with the tank and the dippers at one side carrying a measured quantity of liquid will be elevated and such measured quantity of liquid will flow down the channels and into the feed tubes.

A further primary object of the invention is to provide dams carried by the upper ends of the tubes above the openings in the tubes and across the channels for guiding liquid flowing down the channels into the openings and into the tubes.

A still further object of the invention is to provide a simple and positive means for supplying liquid to the feed tubes of the tank upon the rocking or rolling thereof in either direction, which can be economically embodied in the oiler.

With these and other objects in view, the invention consists in the novel construction, arrangement and formation of parts, as will be hereinafter more specifically described and claimed and illustrated in the accompanying drawings, in which drawings, FIGURE 1 is a front elevational view of the oiler showing my improvements incorporated therewith, parts of the view being shown broken away and in section to illustrate structural detail;

FIGURE 2 is an enlarged fragmentary longitudinal sectional view through the oiler taken on the line 2—2 of FIGURE 3, looking in the direction of the arrows;

FIGURE 3 is a transverse sectional view through the oiler, the section being taken on the line 3—3 of FIGURE 2, looking in the direction of the arrows, the view showing the tank in its normally upright position;

FIGURE 4 is a view similar to FIGURE 3 but showing the tank in a rolled or rocked position with measuring dippers on one side delivering liquid to the feed tubes, and FIGURE 5 is a fragmentary horizontal sectional view taken on the line 5—5 of FIGURE 3, looking in the direction of the arrows and illustrating the position of the channels and dippers relative to a feed tube.

Referring to the drawings in detail, wherein similar reference characters designate corresponding parts throughout the several views, the letter O generally indicates the oiler for livestock embodying my invention, and as in my prior patent, the same includes a horizontally disposed reservoir tank 10. The tank is preferably cylindrical in shape and has welded or otherwise secured to the axial centers of its end walls 11, stub shafts 12. The outer ends of these stub shafts are preferably threaded.

The tank 10 is freely suspended from its stub shafts 12 from a suitable frame 13. The frame can include spaced uprights or posts 14 and an upper connecting cross-beam 15.

Secured to the upper corners of the frame 13 are flexible hangers or chains 16 and the lowermost links of the chains are passed over the stub shafts 12. Nuts 17 can be threaded on the stub shafts to prevent accidental displacement of the chains from the shafts. The stub shafts and consequently the reservoir tank, are free to rotate in the chains and the tank is free to swing with the chains.

Disposed below the tank 10 and extending the full length thereof is an oil distributing trought 18. This trough is preferably formed from angle iron for the sake of simplicity and cost, and this trough at its apex is provided with a row of openings 19. The trough 18 is so disposed that its flanges on the side walls extend uppermost with its angle and openings 19 lowermost. A plurality of depending studs 20 are welded or otherwise secured to the bottom of the tank and these studs extend through openings in the trough. Nuts 21 are threaded on the studs tight against the lower edge of the trough for drawing the upper edge of the trough against the bottom of the tank.

The trough also forms means for holding the flexible applicator 22 in place. This applicator can be made from any suitable type of fabric and the same is draped over the trough, as best shown in FIGURE 3. As the applicator forms no part of the present invention the same will not be described in detail.

Means is provided for feeding liquid from the tank to the trough each time the tank is turned on or rocked with the chains 16. This means includes feed tubes 23 normally positioned in a vertical plane when the tank is at rest. The lower ends of the feed tubes 23 are tapered, as at 24, and are pushed into openings 25 formed in the tank bottom. The applicator 22 can be provided with openings 26 directly below the tubes so as to not interfere with the flow of the liquid from the feed tubes into the troughs 18. The feed tubes are preferably located adjacent to the opposite ends of the tank 10 and the upper ends thereof terminate in close proximity to the upper of the tank.

In accordance with my present invention, I provide openings 27 in the opposite sides of the feed tubes and these openings are located adjacent to the upper end of the tank. The flow of oil through the openings can be controlled by screws 28 threaded into the upper ends of the feed tubes 23 through openings 29 in the top of the tank. Obviously, by threading the screws up or down in the tubes the size of the openings 27 can be regulated.

The tubes on each side carry downwardly and outwardly inclined channels 30 and the lower ends of these channels are provided with dippers 31 of a desired size. The upper ends of the channels terminate directly below the openings 27 so that when the tank is tilted and the dippers 31 are raised out of the liquid, the liquid in the dippers will flow down the channels and into the openings.

The channels 30 and their dippers 31 can be made in various manners, but I propose to take a straight length of tube and cut the tube approximately in half longitudinally. The cut is started at a point inward from the ends of the tube and the extreme ends of the tube are then pinched inwardly into abutting engagement, as at 32. This cutting forms the channels and the dippers and the cut tube are bent at the transverse centers so that the channels extend downwardly and outwardly. The transverse center of the tube is now provided with an opening and the cut tube is slipped over its feed tube 23 with the channels positioned directly below the openings 27 as heretofore stated.

If desired the cut and bent tube can be welded or otherwise secured to the feed tubes 23. The channels 30 with their dippers 31 are preferably made from soft metal, such as copper, and if preferred, in lieu of cutting the bent tube entirely away to form the channels, another method can be pursued. The transverse cuts are made adjacent to the opposite ends of the copper tube and the metal between the cuts is then bent inwardly against the remaining wall.

As heretofore brought out when the animals rub against the tank or applicator and pass under the same, the tank 10 will swing and rock on the chains and the dippers at one side will be elevated. Consequently, the oil held in the dippers will flow down the channels 30 through the openings 27 down the feed tubes 23 and into the distributing trough 18.

In order to insure the proper flow of the liquid into the openings 27, I provide a dam 33 at the upper ends of the channels 30 just above the openings. Each dam can be made from a plate and each plate is provided with an opening and hence the plate can be slipped over the upper end of the feed tube 23 with which it is associated down against the upper ends of the channels 30. If desired, the side edges of the dams 33 can be bent down into clinching engagement with the upper ends of the channels 30, as shown at 34 in FIGURE 2 of the drawings. Thus, if desired the dams can be utilized for holding the channels 30 and dippers 31 in place. In this instance, the dams are welded to the feed tubes 23 (see FIG. 3). Thus, the dams are positioned at the upper ends of the channels and the dams function as stops and guides for oil flowing down the channels and the dams direct the oil or other liquid into the openings 27.

From the foregoing description it can be seen that I have provided an exceptionally simple and economical means for insuring the proper delivery of the liquid in the tank to the feed tubes each time the tank is rolled or swung by an animal.

Various changes in details may be made without departing from the spirit or the scope of this invention but what I claim as new is:

1. In a rubbing and oiling station for animals, an overhead support, an elongated reservoir tank for liquid suspended from said support for free rolling and tilting movement, a liquid distributing trough carried by the lower end of the tank and having a plurality of outlet openings throughout its length, and means for delivering liquid from the tank to the trough including upright feed tubes carried by the tank and opening out through the bottom thereof into the trough, said tubes extending upwardly toward the top of the tank and having inlet openings in the opposite sides thereof above the liquid level in the tank, dippers normally immersed in the liquid in the tank and downwardly and outwardly inclined channels communicating with and supporting the dippers and carried by the tubes adjacent to their upper ends and having communication with the inlet openings, whereby upon tilting of the tank liquid in the dippers will flow down the channels into said inlet openings and said dippers and channels being formed from a single length of tube with the ends of the tube compressed to form end walls, said tube being cut away along its length at one side from points spaced from the outer ends thereof and means for rigidly securing the upper ends of the channels to the tube, including a dam plate slipped over the upper end of the tube and secured thereto with the sides bent over said channels.

2. In a rubbing and oiling station for animals, an overhead support, an elongated reservoir tank for liquid suspended from said support for free rolling and tilting movement, a distributing trough carried by and abutting the bottom of said tank and having a plurality of outlet openings formed therein throughout its length, means for supplying liquid from the tank to the trough including a feed tube disposed within the tank and opening out through the bottom of the tank into the trough, said feed tube having inlet openings therein adjacent to the upper ends thereof and above the normal level of liquid in the tank, dippers disposed on opposite sides of the tubes and normally immersed in the liquid in the tank, channels inclining upwardly and inwardly toward the tube and in engagement therewith adjacent to said openings, and dams carried by the upper ends of the tubes extending across the channels for directing and guiding liquid from the channels into said openings, whereby upon the rocking of said tank and tilting thereof liquid in the dippers will flow down said channels and into said openings.

References Cited by the Examiner
UNITED STATES PATENTS

| | | | |
|---|---|---|---|
| 2,949,885 | 8/60 | Worden | 119—157 |
| 2,961,998 | 11/60 | Hesse | 119—157 |
| 2,983,252 | 5/61 | Hesse | 119—157 |
| 3,020,883 | 2/62 | Elwick | 119—157 |
| 3,071,111 | 1/63 | Hamilton | 119—157 |

SAMUEL KOREN, *Primary Examiner.*

ALDRICH F. MEDBERY, *Examiner.*